(12) United States Patent
Pham et al.

(10) Patent No.: US 8,538,019 B2
(45) Date of Patent: *Sep. 17, 2013

(54) METHOD AND APPARATUS FOR CONFIGURING NODES IN A WIRELESS NETWORK

(75) Inventors: Cuong Pham, Seattle, WA (US); John Wu, San Diego, CA (US); Ulf Soderberg, Taby (SE)

(73) Assignee: Novatel Wireless, Inc., San Diego, CA (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/216,146

(22) Filed: Aug. 23, 2011

(65) Prior Publication Data

US 2012/0171991 A1    Jul. 5, 2012

Related U.S. Application Data

(63) Continuation of application No. 11/674,999, filed on Feb. 14, 2007, now Pat. No. 8,005,217.

(60) Provisional application No. 60/772,998, filed on Feb. 14, 2006.

(51) Int. Cl.
*H04K 1/00* (2006.01)

(52) U.S. Cl.
USPC ............ 380/247; 455/410; 455/411; 455/418

(58) Field of Classification Search
USPC ................. 455/410, 411, 418; 380/247, 255, 380/264, 270
See application file for complete search history.

(56) References Cited

U.S. PATENT DOCUMENTS

2005/0159184 A1    7/2005  Kerner

OTHER PUBLICATIONS

International Search Report for PCT/IB2007/004152, dated Mar. 4, 2008.

*Primary Examiner* — Temica M Beamer
(74) *Attorney, Agent, or Firm* — AlbertDhand LLP

(57) ABSTRACT

Methods, systems, devices and computer programs for configuring nodes on a wireless network can include generating a security key for the network, setting the security settings on the access point based on the security key, and saving the security key in a profile data file on a removable memory device along with a portable configuration utility for using the profile data file for configuring other nodes on the network. The removable memory device can then be inserted into other nodes and the portable configuration utility can be run to match the same key on the other network nodes based on the information stored in the profile data file on the removable memory device.

21 Claims, 9 Drawing Sheets

```
<?xml version="1.0" ?>
<wp:WirelessProfile xmlns:wp="http://www.microsoft.com/provisioning/WirelessProfile">
<wp:version>1</wp:version>
<wp:ssid>NovatelWireless</wp:ssid>
<wp:connectionType>ESS</wp:connectionType>
<wp:authentication>Shared</wp:authentication>
<wp:encryption>WEP</wp:encryption>
<wp:networkKey>6274705536305B332F33237222</wp:networkKey>
<wp:keyIndex>1</wp:keyIndex>
<wp:keyProvidedAutomatically>false</wp:keyProvidedAutomatically>
<wp:IEEE802.1XEnabled>false</wp:IEEE802.1XEnabled>
</wp:WirelessProfile>
```

METHOD AND APPARATUS FOR CONFIGURING NODES IN A WIRELESS NETWORK

CROSS REFERENCE TO RELATED APPLICATIONS

This application is a continuation of U.S. patent application Ser. No. 11/674,999 filed on Feb. 14, 2007, and issued on Aug. 23, 2011 as U.S. Pat. No. 8,005,217, which claims priority to U.S. Provisional Application No. 60/772,998, filed on Feb. 14, 2006, both of which are incorporated herein by reference.

FIELD OF THE INVENTION

The present invention relates generally to systems and methods for configuring nodes in a wireless network. More particularly, the present invention relates to configuring nodes on a wireless network using a removable memory device.

BACKGROUND OF THE INVENTION

In recent years, wireless networks have emerged as flexible and cost-effective alternatives to conventional wired local area networks (LANs). At the office and in the home, people are gravitating toward use of laptops and handheld devices that they can carry with them while they do their jobs or move from the living room to the bedroom. This has led industry manufacturers to view wireless technologies as an attractive alternative to Ethernet-type LANs for home and office consumer electronics devices, such as laptop computers, Digital Versatile Disk ("DVD") players, television sets, and other media devices. Furthermore, because wireless networks obviate the need for physical wires, they can be installed relatively easily.

Wireless communication systems adapted for use in homes and office buildings typically include an access point coupled to an interactive data network (e.g., Internet) through a high-speed connection, such as a digital subscriber line (DSL) or cable modem. The access point is usually configured to have sufficient signal strength to transmit data to and receive data from remote terminals or client devices located throughout the building. For example, a portable computer in a house may include a PCMCIA card with a wireless transceiver that allows it to receive and transmit data via the access point. Data exchanged between wireless client devices and access points is generally sent in packet format. Data packets may carry information such as source address, destination address, synchronization bits, data, error correcting codes, etc.

A variety of wireless communication protocols for transmitting packets of information between wireless devices and access points have been adopted throughout the world. For example, in the United States, IEEE specification 802.11 and the Bluetooth wireless protocol have been widely used for industrial applications. IEEE specification 802.11, and Industrial, Scientific, and Medical (ISM) band networking protocols typically operate in the 2.4 GHz or 5 GHz frequency bands. In Europe, a standard known as HIPERLAN is widely used. The Wireless Asynchronous Transfer Mode (WATM) standard is another protocol under development. This latter standard defines the format of a transmission frame, within which control and data transfer functions can take place. The format and length of transmission frames may be fixed or dynamically variable In a manner similar to the wireless router described above, fixed wireless systems involve systems that are capable of enabling wireless communication, however fixed wireless systems also generally connect to the interactive data network through a broadband wireless connection. Fixed wireless systems are referred to as "fixed" because they are typically situated in fixed locations. Unlike the mobile devices, such as portable telephones and personal digital assistants that can be configured to connect to a wireless router, fixed wireless devices can be much larger in size, less mobile, and can include devices such as desktop personal computers.

Although having an enormous amount of potential, fixed wireless communication has traditionally lagged wired systems in both usefulness and popularity. A primary contributing factor for this phenomenon has been the fact that data transmission in wired systems has far exceeded data transmission in wireless systems. In the past, data transmission rates for fixed wireless systems have lagged Integrated Services Digital Network (ISDN) transmission rates or even dial-up transmission rates across conventional telephone lines.

However, the obstacles to using fixed wireless systems are rapidly being overcome. With the advent of Third Generation Wireless (3G) technologies, Universal Mobile Telecommunications System (UMTS)/Wideband Code Division Multiple Access (WCDMA) technologies in Europe, and Evolution Data Only (1xEVDO) technologies in North America, fixed wireless has become a viable option for wireless broadband access in the home as part of the overall operator's 3G portfolio. Already, fixed wireless systems are capable of downlink throughput access rates in the hundreds of kilobits per second, and megabit rates will be widely available in the near future. As a result of these advances fixed wireless access through UMTS, High Speed Packet Data Access (HSDPA) or 1xEVDO is rapidly becoming a superior choice to ISDN or dial-up systems. In fact, some or all of these systems will equal or surpass the transmission rates of digital subscriber line (DSL) systems in the not-too-distant future.

As fixed wireless systems continue to increase in quality and performance, improved "gateway" products become increasingly important. Wireless gateway products are needed to permit fixed wireless devices such as personal computers, peripheral devices and other devices within a local area network (LAN) to access and communicate with larger, wide area networks (WANs). As transmission rates continue to increase, wireless gateway devices must be able to manage more and more wireless-capable devices while maintaining high transmission rates among the devices and the larger networks.

Both wireless routers and fixed wireless gateways as well as the mobile devices which connect to the router or gateway need to be configured before a mobile device can connect to the interactive data network through the router or gateway. This configuration can include setting certain identification and security information, such as a service set identifier and security key, on the router or gateway and each mobile device A service set identifier (SSID) is a sequence of characters that uniquely names a wireless local area network (WLAN). This name allows mobile devices to connect to the desired network through the router or gateway when multiple independent networks operate in the same physical area. Each set of wireless devices communicating directly with each other is called a basic service set (BSS). Several BSSs can be joined together to form one logical WLAN segment, referred to as an extended service set (ESS). A Service Set Identifer (SSID) is typically a 1-32 byte alphanumeric name given to each ESS.

For example, a departmental WLAN (ESS) may consist of several access points (APs), such as routers or gateways, and dozens of mobile devices, all using the same SSID. Another organization in the same building may operate its own departmental WLAN, composed of APs and mobile devices using a different SSID. One purpose of SSID is to help stations in department A find and connect to APs in department A, ignoring APs belonging to department B.

A WLAN can also be configured with security features to protect against casual eavesdropping. Wired Equivalent Privacy (WEP) and WiFi Protected Access-Pre-Shared Key (WPA-PSK) are sample methods for securing an IEEE 802.11 WLAN. WEP refers to the intent to provide a privacy service to WLAN users similar to that provided by the physical security inherent in a wired LAN. When WEP is active in a WLAN, each packet of information is encrypted separately with an RC4 cipher stream generated by a 64-bit RC4 key. RC4 is a symmetric algorithm because it uses the same key for the encryption and decryption of data. This key is composed of a 24-bit initialization vector (IV) and a 40 bit WEP key. The encrypted packet can be generated with a bitwise exclusive OR (XOR) of the original packet and the RC4 stream. The IV can be chosen by the sender and can be changed periodically so every packet won't be encrypted with the same cipher stream. The IV can be sent in the clear with each packet. An additional 4-byte Integrity Check Value (ICV) can be computed based on the original packet and appended to the end. The ICV can also be encrypted with the RC4 cipher stream.

Wi-Fi Protected Access (WPA and WPA2) is a class of systems to secure (Wi-Fi) computer networks that was created in response to several perceived weaknesses in previous security systems such as WEP. In the "pre-shared key" (PSK) mode of WPA, every user in a WLAN is given the same key or passcode. Similar to WEP, data is encrypted using the RC4 steam cipher, usually with a 128-bit key and a 48-bit initialization vector. The passcode used by WPA in PSK mode may be from 8 to 63 ASCII characters or 64 hexadecimal digits (256 bits).

Both WEP and WPA-PSK require the operator of a network to set a key or passphrase on the Access Points (APs) of the WLAN and match the same key on each client station connected to the AP. Access points (such as routers and gateways) and client stations (mobile devices) must be programmed with the same key. Experts highly recommend that the key be sufficiently long and random and be changed frequently to impede hackers from cracking the key and gaining unauthorized access to the WLAN. One problem associated with wireless gateways and routers is that set up can sometimes be difficult or confusing to the owner. This can be especially true if the user wishes to set up enhanced security such as WEP or WPA-PSK on the network. Generating a key that is sufficiently long and random is not necessarily straightforward. Configuring every node on the network with the SSID and key can be a tedious and difficult process. Setup usually involves configuring the router or gateway settings and then configuring each mobile device the user wishes to communicate through the router or gateway with the same settings as configured on the router or gateway. Repeating this procedure frequently can become very cumbersome.

SUMMARY OF THE INVENTION

The present invention provides for a system and method for setting up nodes of a WLAN. Embodiments of the invention include a method of configuring nodes in a wireless network using a removable memory device comprising:

inserting the removable memory device into a first node in the network;
running a configuration utility configured to automatically and randomly generate security information for the wireless network;
configuring the first node of the network using the generated security information;
copying the security information onto the removable memory device;
removing the programmable memory device from the first node;
inserting the programmable memory device into another node of the wireless network; and
configuring the other node of the network using the generated security information.

This process can be repeated until every node in the wireless network has been configured. In one embodiment, the configuration utility can be preloaded on the first node. Configuration information can be read from the first node, stored onto the removable storage medium and used to configure the other nodes of the network. The first node can include a configuration button configured to run the configuration utility such that pressing the configuration button runs the configuration utility. A portable configuration utility can be copied from the first node onto the removable storage medium. The portable configuration utility can be used to configure other nodes of the network. The generated security information can comprise, among other things, a security key and configuration information can comprise, among other things, a service set identifier (SSID).

Another embodiment of the invention includes a wireless router. The wireless router can comprise an interface for receiving a removable programmable memory device, a client utility, a user interface for starting the client utility, and a server utility. In response to activation of the user interface, the client utility can generate a random security key, send the generated security key to the server utility on the wireless router, generate a configuration profile data file including the generated security key, and save the configuration profile data file and a portable utility program on the programmable memory device. The server utility can be configured to receive the generated security key and set the generated security key on the wireless router. The client utility can also be configured to read a security set identifier (SSID) from the router and generate the configuration profile data file to include the SSID. The client utility can also generate the configuration profile data file to include other security information. For example, other security information may include an encryption type used by the wireless router.

Still another embodiment of the invention can include a removable programmable memory device configured for interfacing with nodes in a wireless network. The memory device can comprise a configuration profile data file including security information related to the nodes in the wireless network, a portable utility program configured for installing the configuration profile data file onto nodes in the wireless network and for automatically setting up security settings on a node in the wireless network when the memory device is coupled to the node. The configuration profile data file can also include configuration information, such a service set identifier (SSID) for the wireless network related to the nodes in the wireless network and the security information can include a security key for the wireless network as well as an encryption type for the wireless network.

A further embodiment of the invention can include a computer program product stored on a removable programmable memory device. The computer program product can comprise computer code for reading wireless security settings from a configuration profile data file stored on the removable programmable memory device and computer code for setting wireless security settings on a node in a wireless network based on the wireless security settings in the configuration profile data file. The computer program product can also include computer code for reading configuration information from the configuration profile data file and setting configuration settings on the node based on the configuration information in the configuration profile data file. The wireless security settings can include a security key and/or an encryption type. The configuration information can include a service set identifier (SSID) for the wireless network.

Another embodiment includes a system for configuring nodes in a wireless communication network. The system can comprise a removable programmable memory device, at least one client station having an interface for accepting the removable programmable memory device, and an access point. The access point can comprise an interface for accepting the removable programmable memory device, a client utility, a user interface for starting the client utility, and a server utility. In response to activation of the user interface, the client utility can generate a random security key, send the generated security key to the server utility, generate a configuration profile data file including the generated security key, and save the configuration profile data file and a portable utility program on the programmable memory device. The server utility can be configured to receive the generated security key and set the generated security key on the access point. The portable utility program on the removable programmable memory device can be configured to set up security settings on the client station(s) based on the generated security key when the removable programmable memory device is coupled to the client station(s). The client utility can also be configured to read a security set identifier (SSID) from the access point and generate the configuration profile data file to include the SSID. The configuration data file can include other security information, such as an encryption type used by the access point. The portable utility program on the removable programmable memory device can be configured to set up security setting settings on the client station(s) based on the other security information when the removable programmable memory device is coupled to the client station. The portable utility program on the removable programmable memory device can also be configured to set up the client station(s) based on the SSID when the removable programmable memory device is coupled to the at least one client station.

These and other objects, advantages and features of the invention, together with the organization and manner of operation thereof, will become apparent from the following detailed description when taken in conjunction with the accompanying drawings, wherein like elements have like numerals throughout the several drawings described below.

BRIEF DESCRIPTION OF THE DRAWINGS

FIG. 6 is a representation of one embodiment of a profile data file used for setting up the nodes of a WLAN according to the present invention;

DETAILED DESCRIPTION OF THE PREFERRED EMBODIMENTS

Figure 1:
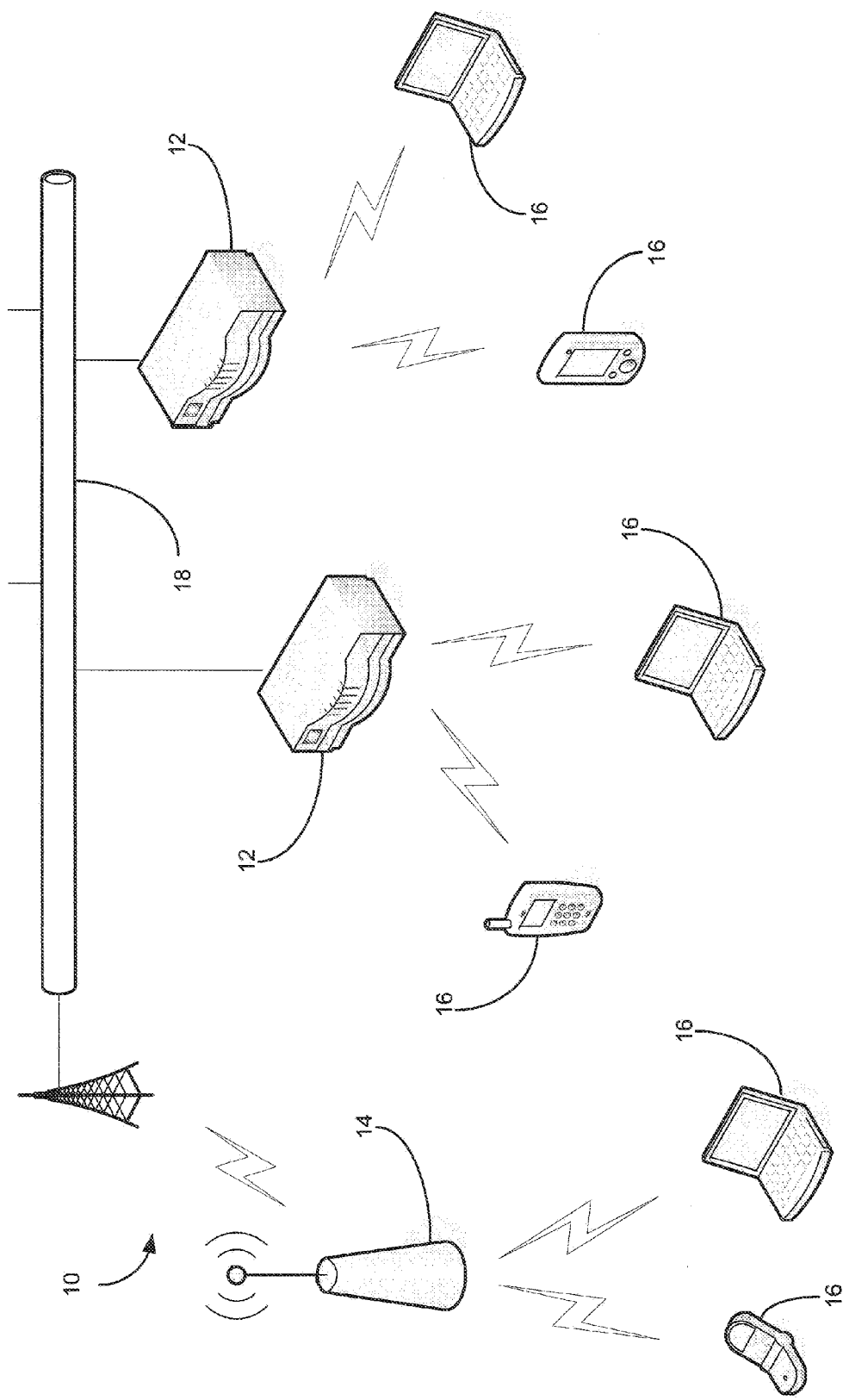
FIG. 1 is a representation of a typical wireless local area network (WLAN)

The present invention provides systems, methods, and devices for setting up the nodes of a wireless local area network (WLAN). As shown in FIG. 1, a WLAN 10 according to the present invention can comprise a plurality of nodes 12, 14, and 16 arranged to communicate with each other over a wireless interface. Nodes typically comprise access points, such as router 12 and gateway 14 devices, and mobile client devices 16. A router 12 is typically a device configured to communicate with mobile client devices 16 over a wireless communications interface. Routers 12 are also usually coupled, through a wired connection, to an interactive data network 18 (such as a corporate network or the Internet). A gateway 14 is also typically configured to communicate with mobile client devices 16 over a wireless communication interface. Gateways 14 are usually coupled to the interactive data network 18 through a wireless connection. Mobile client devices 16 can take many forms including, but not limited to, portable computers, mobile telephones, Instant Messaging Devices (IMD), Personal Data Assistants (PDA), and other devices that can communicate using various wireless transmission technologies.

Router or gateway devices of the present invention can be configured to support a wide variety of interface mechanisms. For example, the device can be configured to support multiple Ethernet ports for connecting to desktop computers. In addition, the device can support USB ports for connections to devices such as computer printers. Still further, other devices such as cordless telephones using Bluetooth or IEEE 802 technology, wireless cameras, or any other wireless sensor can be operatively connected to the gateway device in various embodiments of the present invention. When a gateway device of various embodiments of the present invention is in a "router" mode, it is capable of routing voice, video, and multimedia content back and forth among all of the devices discussed herein and the Internet over a WWAN link.

A residential gateway device can become the center of convergence among WLAN/LAN networks, one or more WAN networks, voice/data transfer systems, and VoIP/Voice Over CS systems. In various embodiments of the invention, such a device can support 802.11 WLAN, Bluetooth pan-access networks (PANs) and/or Ultrawideband PAN/LAN. In this arrangement, data packets can be routed between the WLAN/LAN networks and the WAN network.

Figure 2:
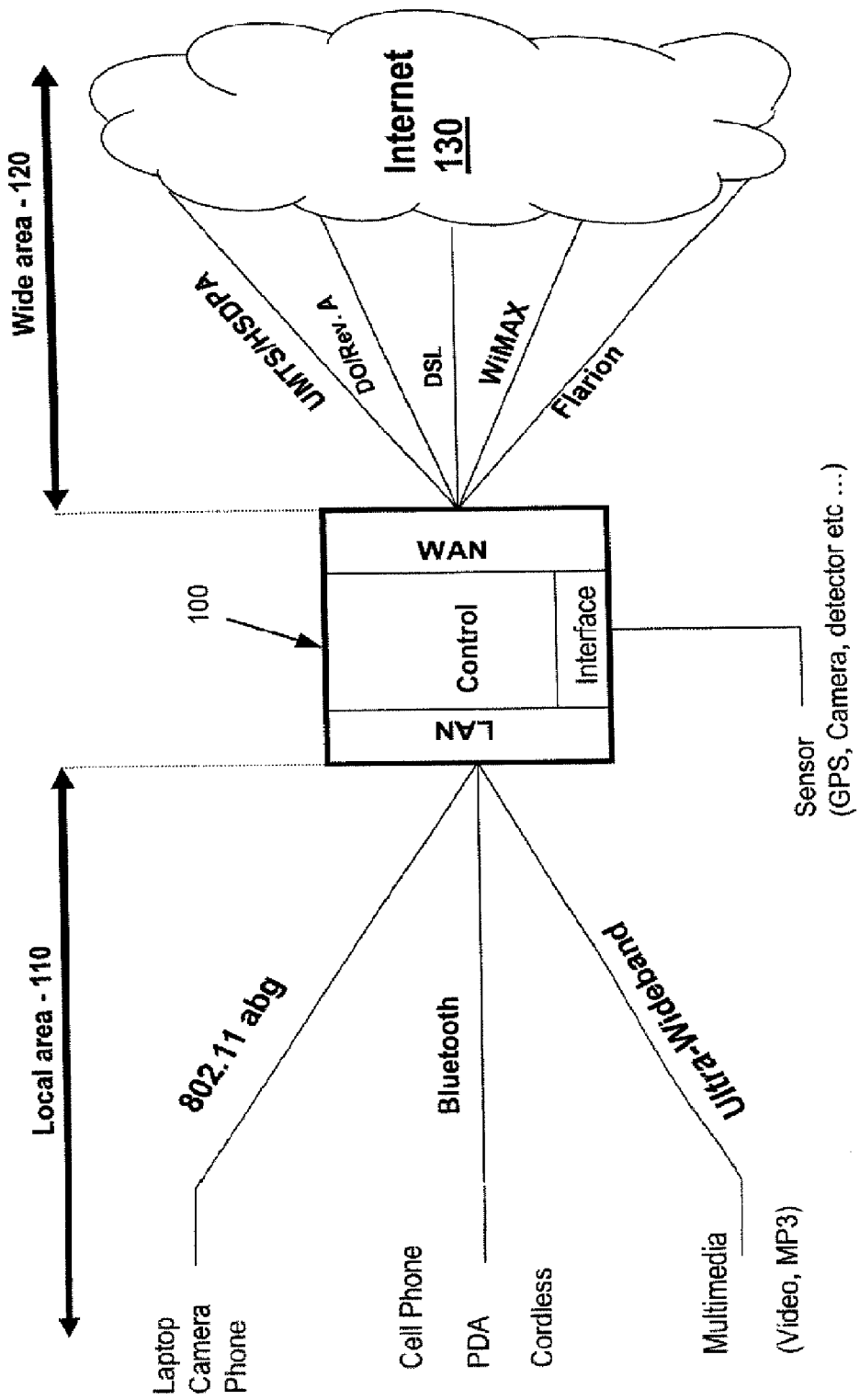
FIG. 2 is a functional diagram showing various types of data transmission that may occur to and from one embodiment of a wireless gateway device according to one aspect of the present invention.

FIG. 2 is a functional diagram showing several types of transmission modes that can be used to transmit data and content through a gateway device 100 with a controller according to the present invention. It should be noted, however, that gateway and router devices according to the present invention are not intended to be limited to the types of transmission modes that are depicted in FIG. 2. Within the local area side 110 of the gateway device 100, transmission modes such as 802.11 a, b and g; Bluetooth, and ultra-wideband transmission mechanisms may be used for communication between the gateway device 100 and various fixed and non-fixed devices. On the wide area side 120, transmission modes such as UMTS/HSDPA; DO/Rev. A, DSL, WiMax, and Flarion may be used to provide communication between the gateway device 100 and the Internet 130.

Figure 3:
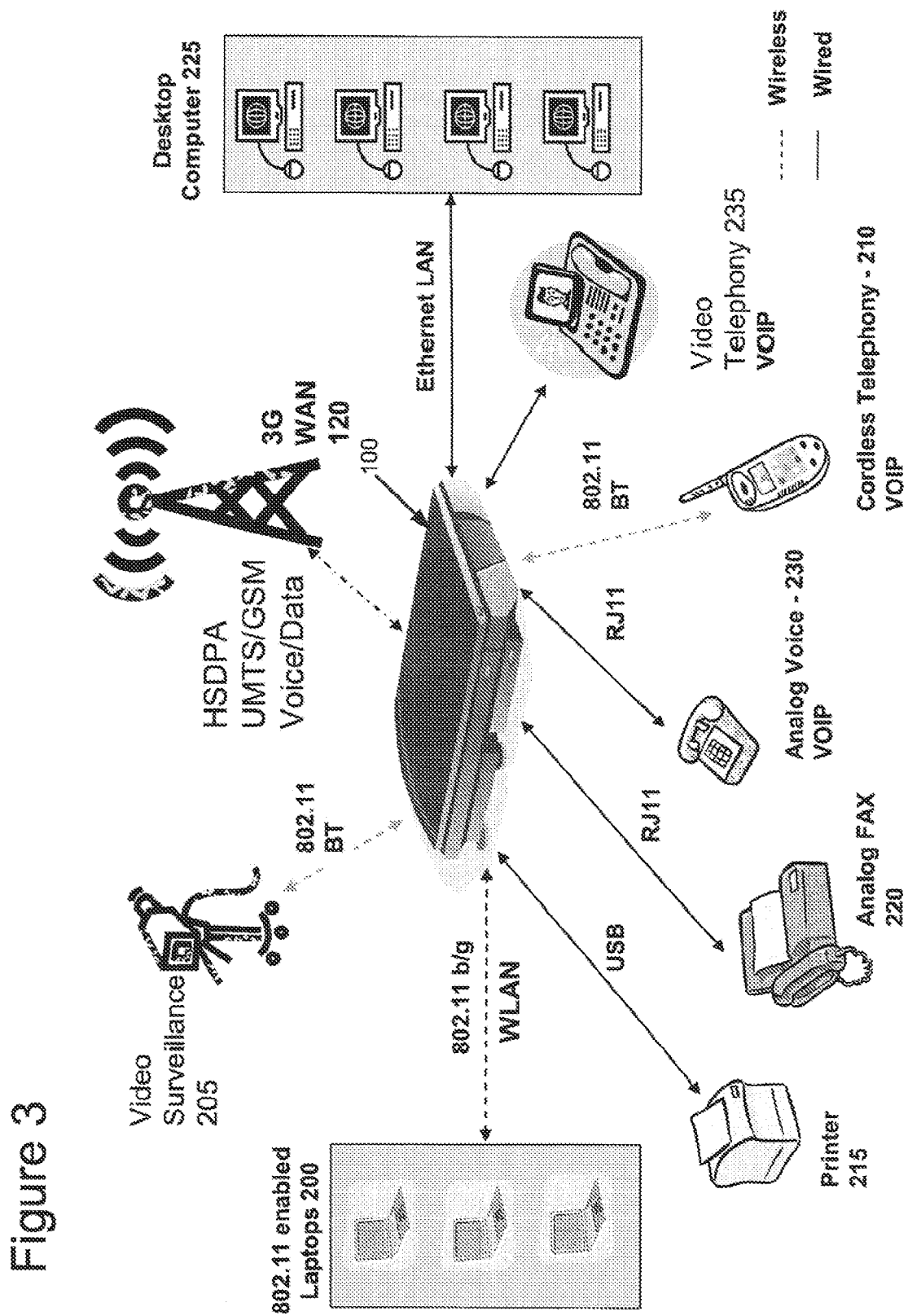
FIG. 3 is a function diagram showing the types of devices that may communicate through one embodiment of a wireless gateway device of the present invention.

FIG. 3 is a functional diagram showing various wireless and wired devices that can communicate through a gateway device 100 of the present invention. It should be understood, however, that the devices shown in FIG. 3 are only exemplary in nature, and wide variety of devices not shown in FIG. 3 could also be used. As shown in FIG. 3, a plurality of 802.11 enabled laptop computers 200 located within a wireless local area network can communicate with the gateway device 100 through a 802.11 b/g connection. Video devices, such as video surveillance equipment 205, can use 802.11 or Bluetooth technology to transmit data to and from the gateway device 100. Similar transmission mechanisms can also be used with cordless telephony 210, which can be used for VoIP transmission. In addition to wireless devices, a variety of wired devices can also communicate with the gateway device 100. For example, a printer 215 can be connected to the gateway device 100 through a USB connection. An analog fax machine 220 can also be connected to the gateway device 100 through a RJ11 connection. In addition, an Ethernet LAN connection can be used to connect the gateway device 100 to one or more desktop computers 225. Still further, an RJ11 connection can exist with an analog voice telephone 230, which is capable of VoIP transmission when integrated with the system. VoIP is also capable using video telephony equipment 235 when operatively connected to the gateway device 100. All of these devices are therefore capable of transmitting through the gateway device 100 to the wide area network 120 using HSDPA, UMTS/GSM, 3G technology, etc.

Figure 4:
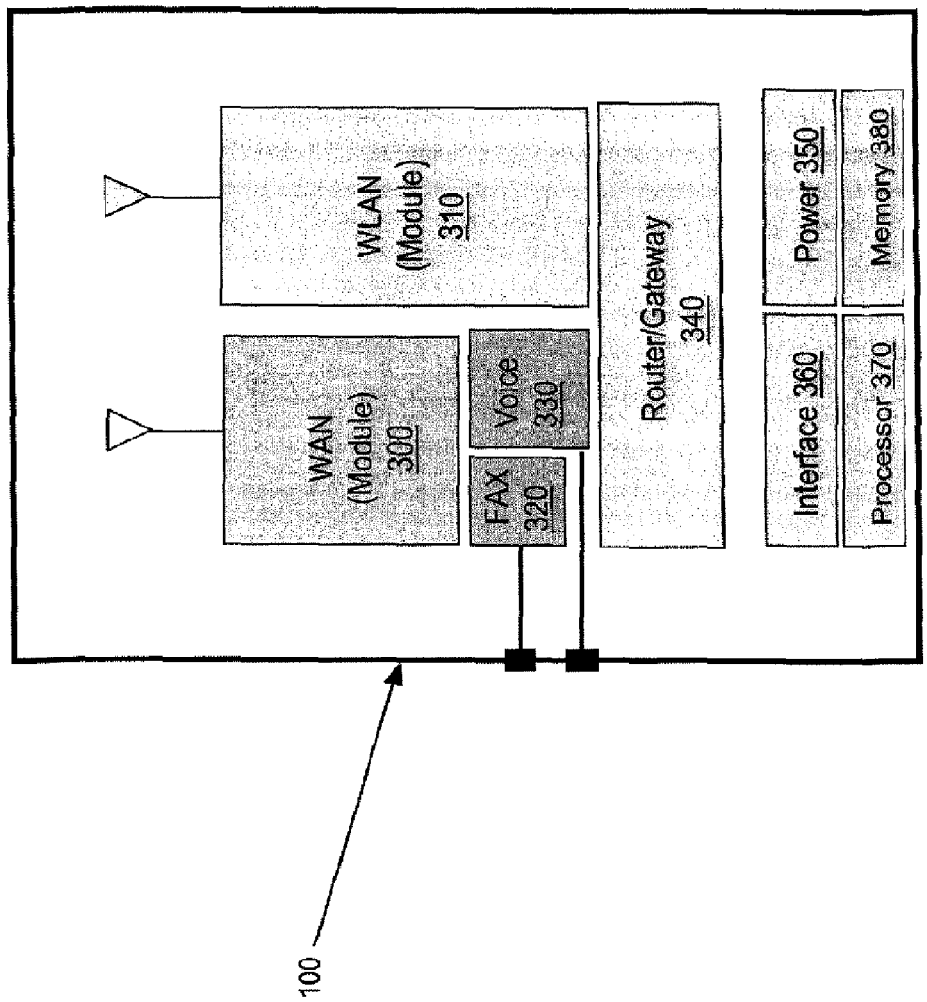
FIG. 4 is a representation of one embodiment of a gateway device architecture according to the present invention.

FIG. 4 is a representation showing the architecture of a gateway device 100 according to one embodiment of the present invention. The gateway device 100 of FIG. 4 includes a WAN module 300 through which WAN activity occurs, as well as a WLAN module 310 for WLAN activity. The gateway device 100 can also include a fax module 320 for providing a communication pathway for the analog fax machine 220 of FIG. 3. In addition, the gateway device can include a voice module 330 for providing a VoIP pathway. A router or gateway 340 can also be included for routing data or content to and from the appropriate location(s). The gateway device also includes a power module 350 for powering the device, as well as one or more interface modules 360 for interfacing with the various local and wide area network devices in communication with the gateway device 100. The gateway device 100 also includes a processor 370 and a memory 380, both of which can be incorporated into other components such as the router or gateway 340.

In one embodiment of the present invention, the gateway device 100 is capable of supporting both VoIP technology, conventional circuit switched wired voice technology and/or circuit switched cellular technology. In this embodiment, voice traffic is capable of routed over a particular system based upon factors such as system QoS or user preferences.

As mentioned above, configuring the various nodes (e.g. routers, gateways, mobile client devices) in a WLAN can be a complicated and confusing process. Each node in the WLAN must be configured with the same SSID so that the nodes can identify and communicate with each other. In addition, if security features are desired, each node must be configured to operate using the same security method and key. In the past, each node in the WLAN needed to be manually configured with the WLAN SSID and security mode and key. This process was tedious and prone to errors. Other methods required all of the nodes of a WLAN to be present when security is enabled. This solutions makes it difficult to add new nodes which can not easily be done without resetting all of the other nodes on the WLAN.

Figure 5:
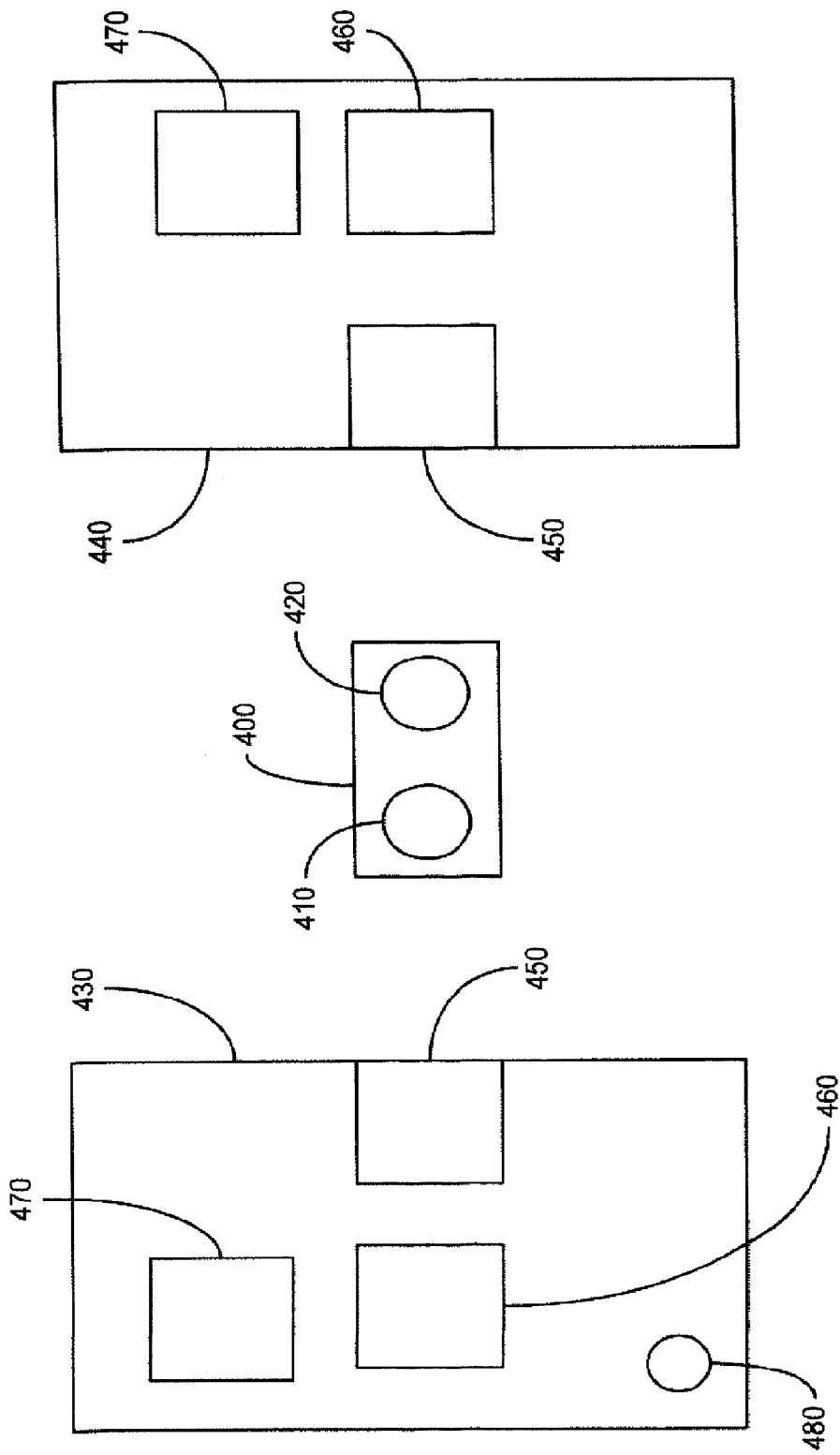
FIG. 5 is a representation of one embodiment of a system for setting up nodes of a WLAN according to the present invention.

In one embodiment of the present invention, shown in FIG. 5, a removable memory device 400 can be used to store the configuration information 410, such as the SSID and security key, and a configuration utility 420. The process of configuring the SSID and security information on a node can be performed by inserting the removable memory device 400 into a node, such as a router 430 or a mobile client device 440, and running the configuration utility 420. Each node 430, 440 includes an interface 450 for receiving the removable memory device 400 as well as a processor 460 and memory 470. In one embodiment, the removable memory device 400 can be a USB dongle and the interface 450 can be a USB connector.

In one embodiment, the configuration information 410 can be stored in a profile data file which can be in the form of an eXtensible Markup-Language (XML) file such as the one shown in FIG. 6. The profile data file can include the WLAN SSID 510 as well as security information such as the type of encryption used 520 and the encryption key 530. The configuration utility 420 can be a software application comprising computer code for generating an SSID 510 and encryption key 530 and for copying the configuration information in memory 470 on the node 430, 440 into which the removable memory device 400 is inserted.

In an alternative embodiment, a router configuration utility can be stored on the router 430, 440 and can be run in the processor 460 of the router 430 to generate the configuration information, store the configuration information into memory 470 on the router 430 and also store the configuration information along with portable configuration utility 420 on the removable memory device 400. The router 430 can include a "configuration" button 480 make running the configuration utility very simple. For example, the user could simply plug the removable memory device 400 into the router 430 and push the "configuration" button 480 which would automatically run the router configuration utility on the router 430. The router configuration utility would automatically and randomly generate the security information and store that information along with the other configuration information 410 and the portable configuration utility 420 on the removable memory device 400. The portable configuration utility 420 can then be run when the removable memory device 400 is interested into the other node(s) 440 of the WLAN so that the generated configuration information 410 can be easily copied into the memory 470 of other node(s) in the WLAN.

Figure 7:
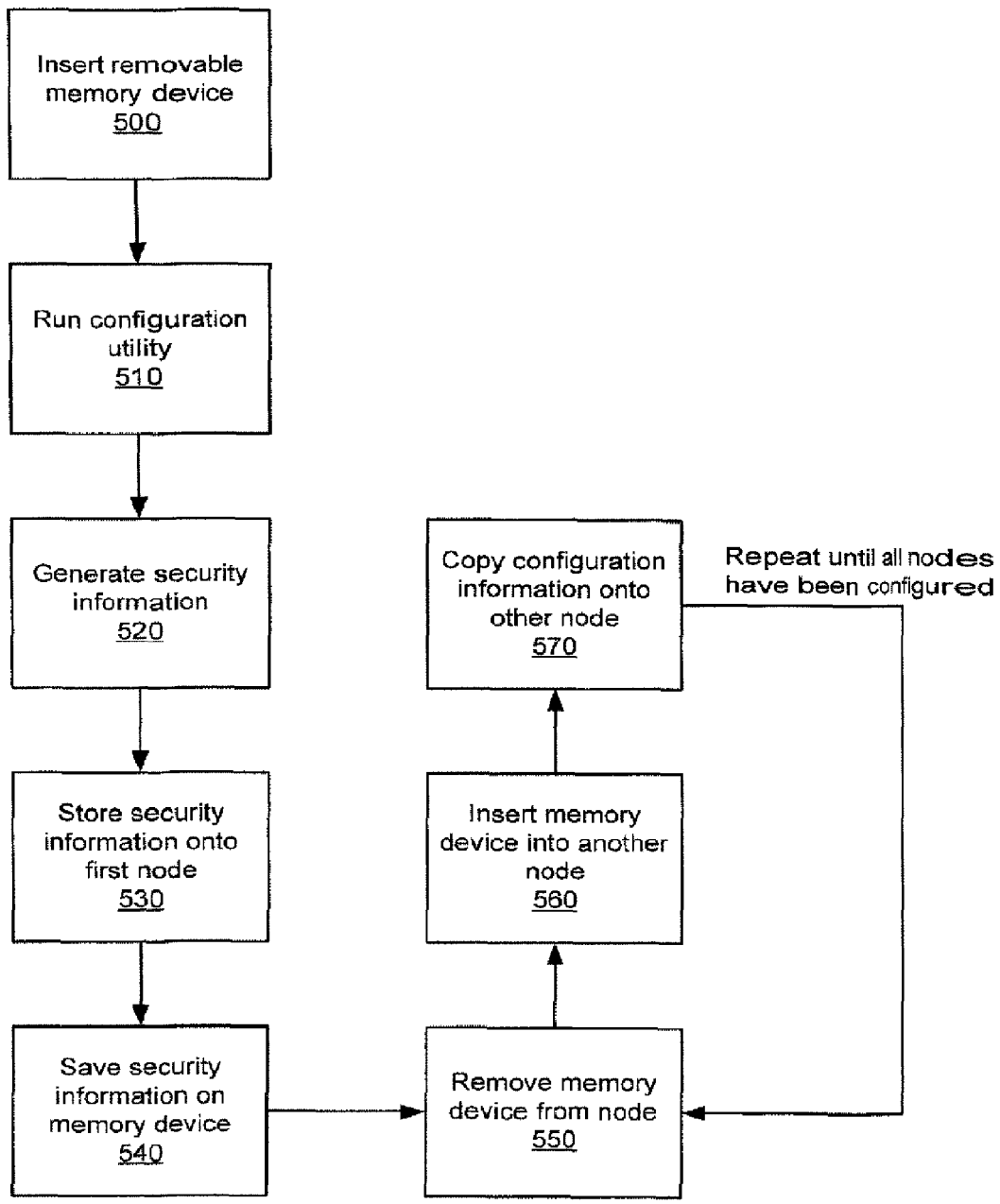
FIG. 7 is a flow diagram of one embodiment of a method for setting up nodes of a WLAN according to the present invention.

One embodiment of a method for configuring nodes in a WLAN according to the present invention is shown in the flow diagram of FIG. 7. The removable memory device can be inserted into the router in step 500. Once the removable memory device is inserted into a first node in the WLAN, the configuration utility can be run in step 510. The configuration utility automatically and randomly generates the security information in step 520. In step 530, the configuration utility stores the security information onto the first node and in step 540, the configuration utility saves the security information onto the removable storage medium. The removable memory device can then be removed from first node in step 550 and inserted into another node in the WLAN in step 560. After the removable memory device is inserted into the other node, the configuration utility can copy the stored security information onto the other node in step 570. This process can continue until all of the nodes in the WLAN have been configured with the security information generated by the configuration utility.

Figure 8:
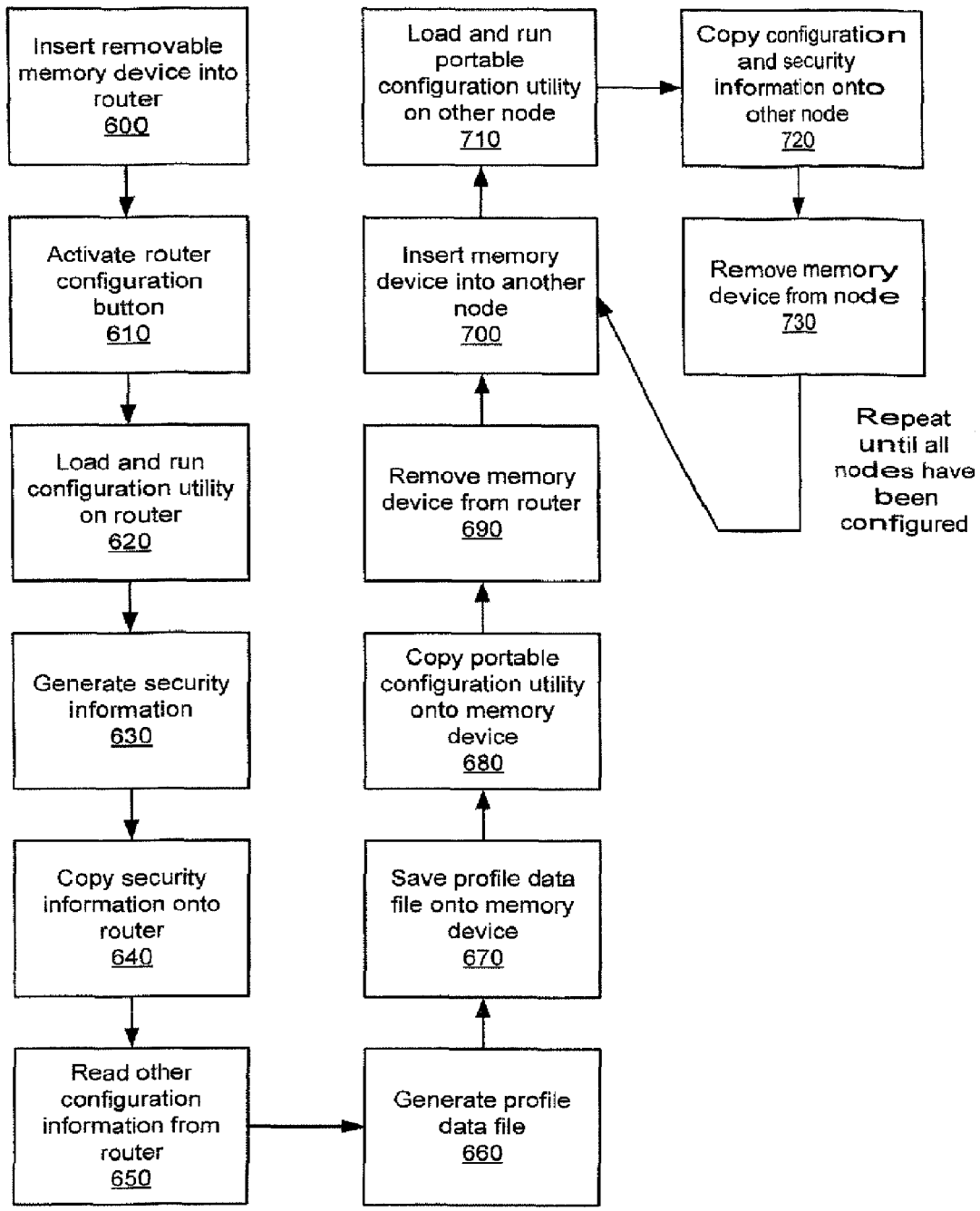
FIG. 8 is a flow diagram of another embodiment of a method for setting up nodes of a WLAN according to the present invention.

In another embodiment of the invention, the configuration utility can be preloaded onto a router in the WLAN. The flow diagram shown in FIG. 8 describes another method according to the present invention. In this case, the programmable memory device is inserted into the router in step 600. Once the programmable memory device is inserted into the router, the user can press a configuration button on the router in step 610 which causes the configuration utility to be loaded into memory on and run by the processor on the router in step 620. In step 630, the configuration utility automatically and randomly generates security information, such as the encryption type and network security key. In step 640, the configuration utility copies the security information onto the router. The configuration utility can also read the SSID and other configuration information from the router in step 650, generate a profile data file including the security information and/or other configuration information in step 660, save the profile data file onto the removable memory device in step 670 and copy portable configuration utility onto the removable memory device in step 680. Once the profile data file and portable configuration utility are saved onto the removable memory device, the device can be removed from the router in step 690 and inserted into another node of the WLAN in step 700. Once inserted into the other node, the portable configuration utility can be loaded and run in step 710, which causes the configuration and security information to be copied onto the other node in step 720 thus configuring the other node to operate with the router on the WLAN. The removable memory device can then be removed in step 730 and this process can be repeated until every node on the network is configured.

Figure 9:
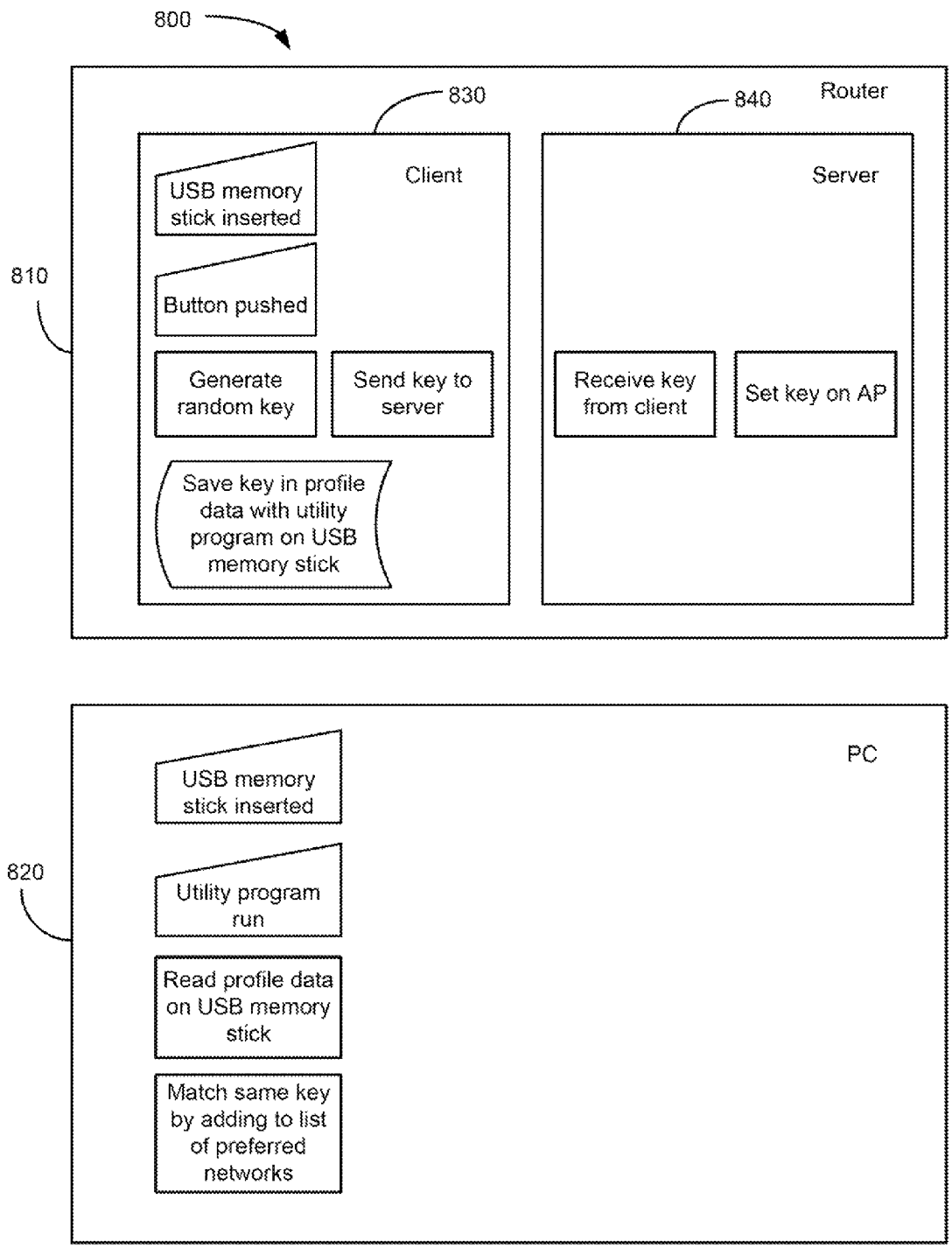
FIG. 9 is a representation of one embodiment of a system for configuring nodes in a wireless network according to the present invention.

FIG. 9 illustrates one embodiment of a system 800 according to the present invention. The system 800 includes an access point 810, such as a wireless router, and a client station 820, such as a wireless enabled personal computer. The access point 810 includes a client utility 830 and a server utility 840. A removable portable memory device (not shown) such as a USB memory stick, can be inserted into the access point 810. In response to a configuration button on the access point 810 being activated, the client utility 830 generates a random security key, saves the key, along with other security and/or configuration information such as the encryption type used by the router and the WLAN SSID, for example, in profile data along with a portable utility program on the removable programmable memory device, and sends the security key to the server utility 840. The server utility 840 receives the security key from the client utility 830 and sets the security settings on the access point 810 based on the security key.

The removable programmable memory device can then be removed from the access point 810 and inserted into the client station 820. Once the removable memory device is inserted into the client station 820, the portable utility program is run which reads the profile data saved on the removable memory device and matches the same security key on the client station 820 by adding it to the list of preferred networks on the client station 820.

The present invention is described in the general context of method steps, which may be implemented in one embodiment by a program product including computer-executable instructions, such as program code, executed by computers in networked environments. Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule based logic and other logic to accomplish the various database searching steps, correlation steps, comparison steps and decision steps. It should also be noted that the words "component" and "module," as used herein and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method of configuring a node in a wireless network, the method comprising:
   connecting a removable memory device to a first node in the wireless network, the first node including a service set identifier (SSID) and security key;
   automatically copying the SSID and security key on the removable memory device;
   disconnecting the removable memory device from the first node;
   connecting the removable memory device to another node in the wireless network;
   automatically running a configuration utility on the another node; and
   the configuration utility configuring the another node using the copied SSID and security key.

2. The method of claim 1 further comprising, automatically storing the configuration utility on the removable memory device prior to the disconnecting of the removable memory device from the first node.

3. The method of claim 1, wherein the SSID and the security key are created via execution of the configuration utility at the first node.

4. The method of claim 3, wherein the creation of the security key comprises a random generation of the security key.

5. The method of claim 1 further comprising, generating a profile data file including the copied SSID and security key.

6. The method of claim 5 further comprising, saving the profile data file on the removable memory device.

7. The method of claim 5 further comprising, saving additional configuration and security information in the profile data file.

8. The method of claim 7, wherein the addition configuration and security information comprises at least one of an encryption type for the wireless network and an encryption key for the wireless network.

9. The method of claim 1, wherein the first node comprises one of a router, a gateway, or a mobile client device.

10. A wireless router, comprising:
a removable memory device interface;
a preloaded configuration utility;
a processor; and
a memory including computer program code, the memory and the computer program code configured to, with the processor, cause the wireless router to perform at least the following:
upon insertion of a removable memory device in the removable memory device interface, automatically and randomly generate security information through the preloaded configuration utility;
copy the security information onto the wireless router;
read configuration information from the wireless router;
create a profile data file including at least the configuration information and the security information; and
store the profile data file and the preloaded configuration utility onto the removable memory device.

11. The wireless router of claim 10, wherein the security data comprises an encryption type and network security key of a wireless network in which the wireless router operates.

12. The wireless router of claim 10, wherein the configuration information comprises a service set identifier (SSID).

13. The wireless router of claim 10, wherein the removable memory device configures a node to operate with the wireless router in a wireless network via transfer of the preloaded configuration utility, the security information, and the configuration information to the node upon removal of the removable memory device from the wireless router and insertion into the node.

14. An apparatus, comprising:
at least one processor; and
at least one memory unit including computer program code, the at least one memory unit and the computer program code configured to, with the at least one processor, cause the apparatus to perform at least the following:
receive a removable memory device;
automatically copy a service set identifier (SSID) and security key of the apparatus to the removable memory device, wherein
disconnecting the removable memory device from the apparatus and connecting the removable memory device to another apparatus in a wireless network common to the apparatus and the another apparatus effectuates automatically running a configuration utility on the another apparatus, the configuration utility configuring the another apparatus to operate with the apparatus using the copied SSID and security key.

15. The apparatus of claim 14, wherein the at least one memory unit and the computer program code configured to, with the at least one processor, further cause the apparatus to automatically store the configuration utility on the removable memory device prior to the disconnecting of the removable memory device from the apparatus.

16. The apparatus of claim 14, wherein the at least one memory unit and the computer program code configured to, with the at least one processor, further cause the apparatus to execute the configuration utility at the apparatus to create the SSID and the security key.

17. The apparatus of claim 16, wherein to create the security key, the configuration utility randomly generates the security key.

18. The apparatus of claim 14, wherein the at least one memory unit and the computer program code are configured to, with the at least one processor, further cause the apparatus to generate a profile data file including the copied SSID and security key.

19. The apparatus of claim 18, wherein the at least one memory unit and the computer program code are configured to, with the at least one processor, further cause the apparatus to save the profile data file on the removable memory device.

20. The apparatus of claim 18, wherein the at least one memory unit and the computer program code are configured to, with the at least one processor, further cause the apparatus to save additional configuration and security information in the profile data file.

21. The apparatus of claim 20, wherein the additional configuration and security information comprises at least one of an encryption type for the wireless network and an encryption key for the wireless network.

* * * * *